Figure 1:
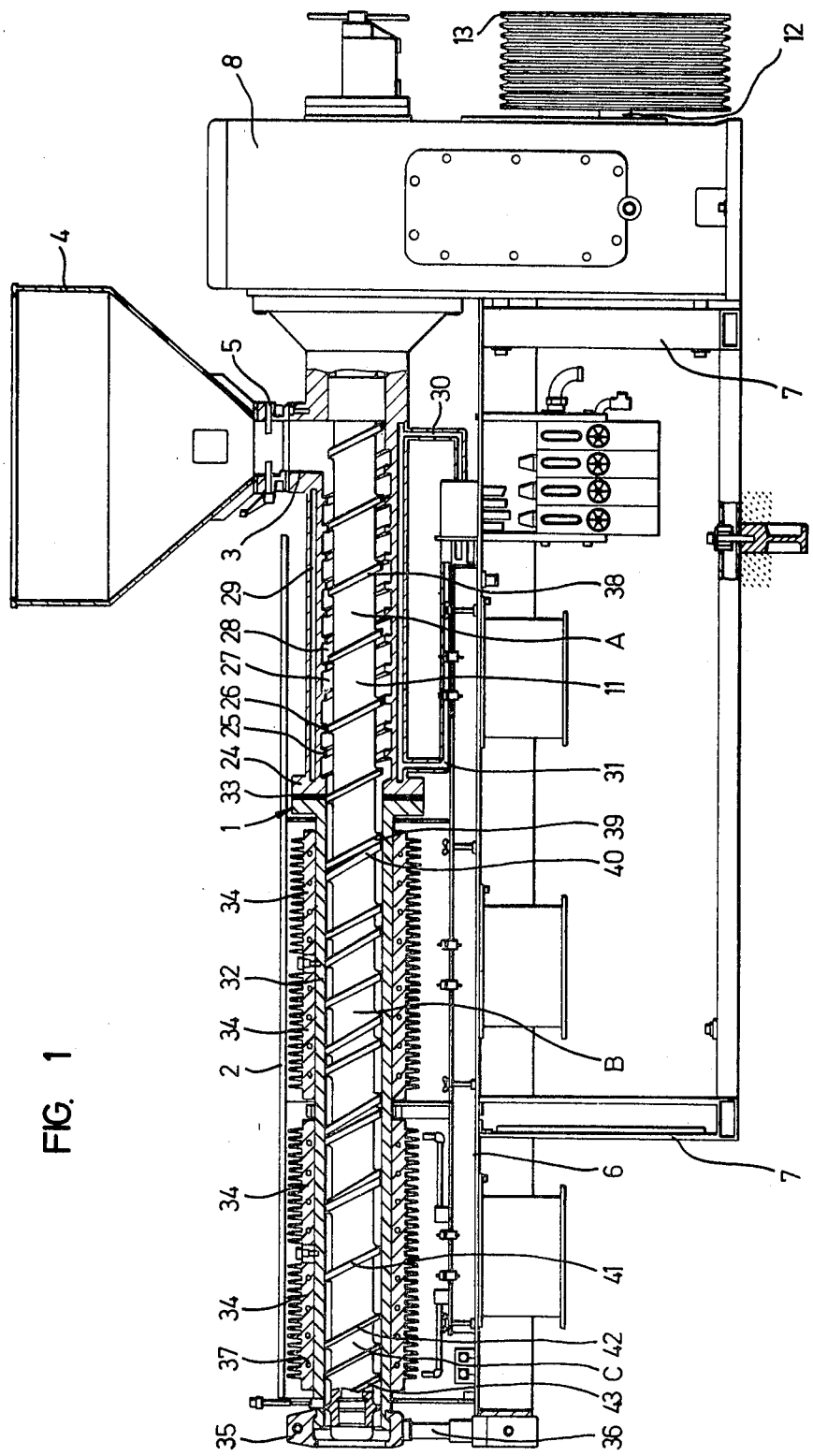

United States Patent [19]

Maillefer

[11] 4,154,535
[45] May 15, 1979

[54] SCREW-TYPE PLASTICS EXTRUDER

[75] Inventor: Charles Maillefer, St-Sulpice, Switzerland

[73] Assignee: Maillefer S.A., Ecublens, Switzerland

[21] Appl. No.: 888,362

[22] Filed: Mar. 20, 1978

[30] Foreign Application Priority Data

Mar. 29, 1977 [CH] Switzerland ......................... 3942/77

[51] Int. Cl.² .......................... B01F 7/08; B01F 15/06
[52] U.S. Cl. ........................................ 366/79; 366/87; 366/144
[58] Field of Search ..................... 366/79, 80, 99, 144, 366/147, 149, 167, 169, 241, 266, 318, 321, 323, 341, 87

[56] References Cited

U.S. PATENT DOCUMENTS

| | | | |
|---|---|---|---|
| 2,449,355 | 9/1948 | Wiley | 18/12 |
| 2,753,595 | 7/1955 | Dulmage | 366/79 |
| 2,765,491 | 10/1956 | Magerkurth | 366/80 |
| 4,039,168 | 8/1977 | Putten | 366/79 |

FOREIGN PATENT DOCUMENTS 2311717 3/1973 Fed. Rep. of Germany ............. 366/87

*Primary Examiner*—Edward J. McCarthy
*Attorney, Agent, or Firm*—Stevens, Davis, Miller & Mosher

[57] ABSTRACT

A one-screw extruder in which the mechanical thrust function is assigned to a first portion of the screw and of the cylinder, and in which the uniform heating of the material to be extruded is the function of a second portion, thus making it possible for each of the two portions to be specialized and to obtain a better performance of the extruder as a whole.

8 Claims, 4 Drawing Figures

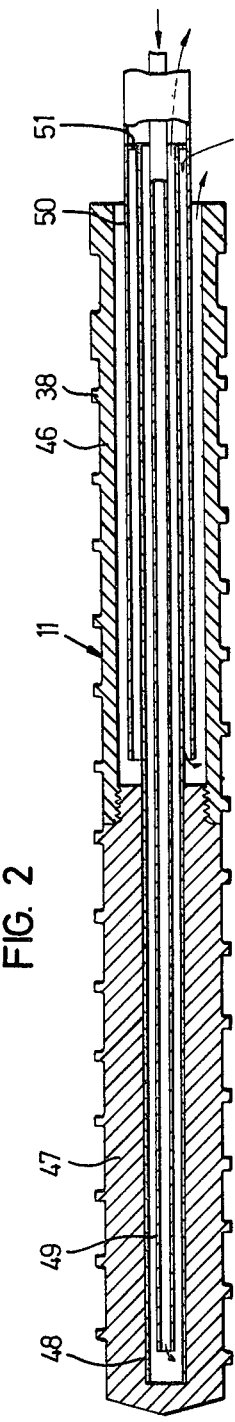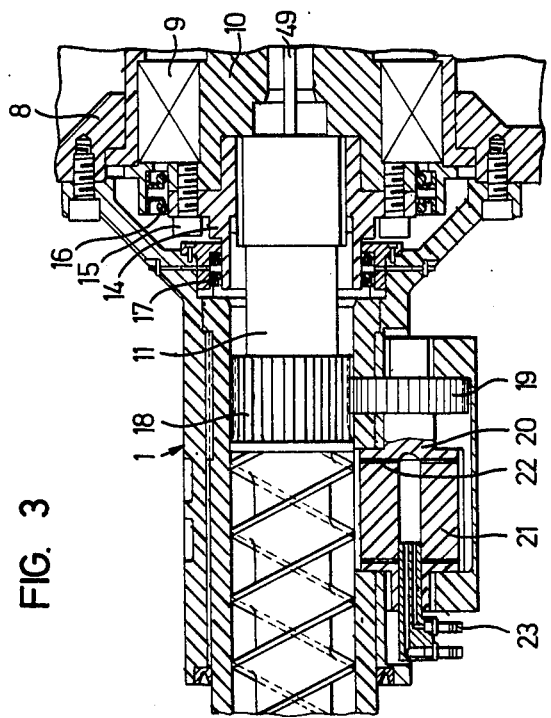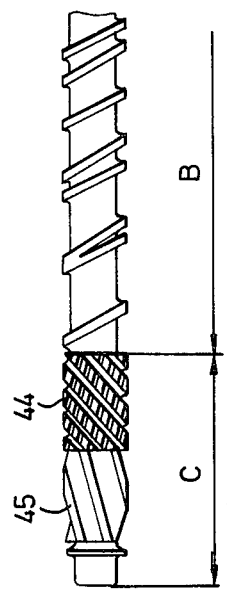
FIG. 2
FIG. 3
FIG. 4

SCREW-TYPE PLASTICS EXTRUDER

This invention relates to extruders, and more particularly to screw-type extruders for plastics.

Numerous theoretical and practical studies have been published on the operation of one-screw extruders. Materials to be processed, such as rubber or synthetic materials, are fed into these extruders at ambient temperature in the form of pellets or powder. The materials are heated, homogenized, and pressed through a die which gives them the desired cross-section. Thus, there are two functions involved: a mechanical one which consists in pushing the material like a pump in order to overcome the resistance of the die, and a thermal one which consists in heating the material uniformly to the suitable softening point for its shaping by the die.

In ordinary extruders, these two functions are performed simultaneously by and along the length of the screw turning within the cylinder. It is difficult to say where the pressure forms and where the material heats up. Efforts have been made to solve this problem by means of mathematical studies, some intended for computer processing (Tadmore & Klein). The viscosity of the material is assumed to decrease along the length of the screw, from the solid condition of the material at the entry to the point where it softens with the increase in temperature. In order that the material may be efficiently thrust towards the extrusion head, i.e., downstream, even when its viscosity has decreased with increased temperature, the depth of the thread of the screw is reduced. A so-called metering zone is thus created at the downstream end of the screw. A drawback of this arrangement is that this shallow depth gives rise to shearing-stresses which often heat the material beyond the desired temperature. The material is liable to decompose or to be unable to retain its shape upon leaving the die.

Numerous attempts have already been made to design extruders in such a way as to increase the output of processed material to the maximum with the smallest possible dimensions while avoiding the phenomena described above which are apt to reduce the structural quality of the plastic material forced through the die.

According to U.S. Pat. No. 2,765,491, the part of the cylinder in the feed zone has a spiral thread projecting from its inner surface, while the screw is likewise provided with a spiral thread. The threads of the cylinder and of the screw have different pitches but run in the same direction. The cylinder is equipped throughout its length with circuits for heating or cooling.

According to German Disclosed Application No. 23 11 717, the screw is provided with a closed cooling circuit extending all along its length, the heat being exhausted by means of an exchanger connected to an outside circuit.

According to U.S. Pat. No. 2,449,466, a screw having a spiral thread on its upstream portion and a torpedo on the downstream portion is equipped with a double heat-exchange circuit arranged to heat the screw differentially in its upstream portion and in its downstream portion.

Practical experiments made in connection with the operation of screw-type extruders under the severest possible conditions have made it apparent that there is a particular combination of the design of the bore of the cylinder, the core of the screw, and the heating or cooling circuits which makes it possible to push the performance of an extruder of given outside dimensions beyond what has already been achieved heretofore, while still ensuring the quality of the material forced into the die, i.e., the homogeneity of the material and its temperature.

Therefore, it is an object of this invention to provide an improved extruder designed in such a way that the screw can be driven at higher speeds than those reached until now and to increase the output at given dimensions while avoiding the danger of overheating and of decomposition of the plastic material.

To this end, there is provided according to the present invention, in a plastics extruder of the type wherein a screw is rotatingly driven within a hollow cylinder and wherein a feed zone is followed by an adjacent plasticizing zone situated downstream from the feed zone, the improvement which comprises a feed zone including a portion of the screw having a cylindrical core, at least one continuous spiral thread of uniform pitch projecting from the core, and a cooling circuit accommodated within the core throughout the entire length of the feed zone, and a portion of the cylinder having one or more spiral threads disposed on the inside surface of the cylinder, delimiting one or more spiral grooves, and running in a direction opposite to that of the spiral thread of the screw portion.

In other words, provision is made for dividing the extruder—and particularly the thread thereof—into at least two separate zones, one of which is intended to push the powder or pellets along while they are still cold, keeping them cold as long as possible to ensure as positive a thrust as possible. To achieve this, frictional forces are brought into play between the surfaces of the screw and of the cylinder, on the one hand, and the material, on the other hand, it being endeavored to keep this material cold in order to take advantage of its mechanical resistance and to avoid its deformation. Therefore, the first portion of the screw and cylinder will preferably be cooled by circulation of a cold fluid such as air, water, or oil, for example.

The spiral threads on the inside surface of the cylinder, running in the opposite direction to those of the screw, promote the downstream thrust. The rate of feed of the feed zone may be calculated as follows:

When the screw effects one revolution, the mass of material effects x revolutions. The cylinder does not rotate. The mass effects $(1-x)$ revolutions with respect to the screw and x revolutions with respect to the cylinder.

The advance of the mass with respect to the screw is $p_v(1-x)$, $p_v$ being the pitch length of the screw; and the advance of the mass with respect to the cylinder is $p_c \cdot x$, $p_c$ being the pitch length of the cylinder spirals.

If there is no internal shear, the advances are equal. Thus the rotation x may be calculated as follows:

$$p_v(1-x) = p_c \cdot x;\ x = p_v/(p_c + p_v)$$

The advance is $$x \cdot p_c = p_c \cdot p_v/(p_c + p_v)$$

The rate of feed per revolution of the screw is $$Q^1 = (p_c \cdot p_v/(p_c + p_v)).$$

average cross-section of the mass.

This portion of the screw thrusts with considerable force, and the pressure rapidly increases if there is retention of the material downstream. The pressure goes on increasing unless there is shearing between the compacted material in the grooves formed by the thread of the screw and that in the grooves of the cylinder. As the material is still cold there, in pellets or compressed powder, this resistance to shear is considerable.

The only function left for the second zone to perform is a thermal one. Therefore, anything necessary for mechanical thrust may be ignored, this zone may be given the configuration most favorable to heat transfer, and elements promoting mixing, homogenization, and kneading may be added, for example.

A preferred embodiment of the invention will now be described in detail with reference to the accompanying drawings, in which:

FIG. 1 is an elevation, partially in section on a vertical plane passing through the axis of rotation of the screw, FIG. 2 is a diagrammatical longitudinal section through the screw, FIG. 3 is a partial section, on a slightly larger scale, taken on a horizontal plane passing through the upstream end of the extruder, and FIG. 4 is a partial plan view of a modification of the screw.

FIG. 1 is an overall view of a screw-type extruder, certain elements of which are identical to those found in conventional extruders. A cylinder, designated as a whole by reference numeral 1, is a metal part surrounded by a protective jacket 2 and having at its upstream end an opening 3 above which a hopper 4 is fixed. A measuring dispenser 5, which need not be described in detail here, is provided at the bottom of the hopper 4. The cylinder 1 is borne by a frame 6 resting on uprights 7. Upstream from the hopper 4, a support casing 8 is fixed to a bearing 9 (FIG. 3) which supports a hub 10 of a wheel (not shown) used for driving a screw 11 housed within the cylinder 1. This wheel is driven from a primary shaft 12 (FIG. 1) bearing a series of belt-driven pulleys 13. The hub 10, which is hollow so that cooling circuits may be connected, as will be described below, is coupled to the extruder screw 11 by means of a rigid coupling comprising a coupling sleeve 14 keyed on the end of the screw 11 and provided with an annular flange held against a corresponding flange of the hub 10 by screws 15. A gasket 16 is disposed between the coupling (14, 10) and the casing 8, while another gasket 17 is disposed between a rear lip of the sleeve 14 and the cylinder 1. In the embodiment shown in FIG. 3, the screw 11 includes, at the entrance to the cylinder 1 before the hopper 4, a toothed part 18 which drives a pinion 19 fixed to a shaft 20, which is in turn fixed to a drum 21 through which ducts 22 pass. A fluid-feed 23 makes it possible to supply the upstream end of the active part of the screw 11 with additives facilitating the operations for preparing the plastic material and/or imparting thereto the specific properties it is desired to obtain.

The design of the cylinder 1 will now be described in more detail. As may be seen from FIG. 1, the upstream portion of the cylinder 1 is made up of a body 24, the inside surface of which is provided with two spiral threads 25 and 26 having the same pitch and the same cross-section. The cross-section of the threads 25 and 26 is substantially square or rectangular in shape, the width of these threads measured in line with the longitudinal axis of the cylinder 1 being distinctly less than their pitch, so that between them they delimit, in the inside surface of the upstream body 24, two grooves 27 and 28 of uniform width and shallow depth which extend from the entrance, i.e., the opening 3, to the immediate vicinity of the downstream end of the body 24.

Running within the wall of the body 24 are ducts 29 connected upstream and downstream to intake and outlet pipes 30 and 31, respectively, so that a coolant can be caused to circulate within the wall of the cylinder 1 all along the upstream portion thereof.

The downstream portion of the cylinder 1 comprises a body 32, the inside surface of which is cylindrical and smooth. At the upstream end of this tubular body 32 is a flange fixed against a corresponding flange of the body 24, with a heat-insulating gasket 33 interposed between these flanges. The gasket 33 may, for example, be a flat ring of a material having low thermal conductivity, such as a fibrous or glass material. If need be, a heat barrier with cooling might also be provided between the bodies 24 and 32 of the cylinder 1, or isothermic elements preventing any heat transfer from one body to the other.

The body 32 is further encircled by sleeves 34 bearing cooling fins. As may be seen from FIG. 1, four such sleeves 34 are provided over the distance separating the upstream flange from the downstream end, which is inserted in an annular support 35 borne by an upright 36 fixed to the frame 6. Ducts 37 running within the walls of the sleeves 34 also provide the possibility of causing a coolant to circulate at the base of the fins, if necessary.

The active portion of the screw 11 will now be described, referring first of all to FIG. 1. The screw 11, which has a cylindrical hub, is divided along its length into three zones, viz., a feed zone A, a plasticizing zone B, and a homogenization zone C. In the feed zone A, the screw 11 comprises a single spiral thread 38, the pitch of which is slightly greater than that of the threads 25 and 26 of the cylinder body 24. The thread 38 runs in the opposite direction from the threads 25 and 26, but it is similar in cross-section to the latter. The length of the feed zone A extends from the opening 3 to the heat-insulating gasket 33. It is in any case more than twice the diameter of the screw 11, and there are six turns of the thread 38.

In the plsticizing zone B, the hub of the screw 11 is likewise cylindrical and has the same diameter as in the zone A. From this hub, there projects a double thread 39, 40. The thread 39 is a continuation of the thread 38, with the same pitch and dimensions, whereas the thread 40 branches off from the thread 39 and runs on the downstream side of the latter at a slightly greater pitch so as to rejoin the thread 39 on its upstream side at the end of the zone B. The threads 39 and 40 may have the same cross-section and the same dimensions, or they may be of slightly different heights. One or both of these threads may include deep, narrow passages connecting the downstream side to the upstream side. Provision may also be made in the plasticizing zone B for dams, guide elements, or any other element promoting kneading of the partially or wholly plasticized plastic material.

Finally, the homogenization zone C, in the embodiment illustrated in FIG. 1, comprises a first part having a single thread 41 followed by a second part having two parallel threads 42 and 43. However, this last part of the screw 11 might equally well comprise kneading sections such as the section 44 and/or the section 45 shown in FIG. 4.

Returning now to the overall make-up of the screw 11 according to FIG. 2, it will be seen to comprise two independent cooling circuits. The screw 11 is composed of a tubular upstream body 46, the outer surface of which bears the thread 38, and of a downstream body 47 which exhibits the threads 39–43 and to which the body 46 is screwed on. Within the body 47 is a cylindrical recess accommodating a guide tube 48 which is integral with the screw 11 and extends along the longitudinal axis thereof. Inserted in the tube 48 is, as may be seen from FIG. 2, a fixed tube 49 borne at the right-hand end thereof, as viewed in the drawings, by a connection-box integral with the casing 8 and not shown in FIG. 3. A fluid-tight gasket 51 is provided between a tubular extension 50 of the connection-box and the end of the tube 48 so that by means of the two tubes 48 and 49, a coolant such as water, air, or oil, for example, can be circulated from the casing 8 to the downstream end of the screw 11.

Furthermore, as may also be seen from FIG. 2, the tubular extension 50, which is fixed like the tube 49 and integral with the connection-box, extends within the body 46 between the tube 48 and the wall of the screw 11. The gasket 51 between the tube 48 and the casing 8 thus divides the space inside the hub 10 and the connection-box into two parts, one of which allows the two-way circulation of a coolant in the upstream portion of the screw 11 (i.e., within the tubular body 46, first outside of the tube 50, then between the tube 50 and the tube 48), while the other allows the circulation of another coolant within the tube 48 to the downstream end of the screw 11. A gasket will be provided between the upstream end of the hub 10 and the casing 8.

Thus two cooling circuits are provided which have separate intakes and outlets and can be controlled and regulated independently of one another so that it is possible to set the temperatures separately in the feed zone, or upstream zone of the extruder, and in the plasticizing and homogenization zones, or downstream zones.

As has been explained above, the degree of cooling in the upstream zone will be regulated in such a way that the plastic pellets or powder will be forced downstream against substantial resistance without undergoing any heating, or at least no more than relatively slight heating. This rapid increase in thrust will be achieved owing to mechanical conditions resulting from the presence of the crossed threads provided on the screw 11 and in the cylinder body 24. Because of the strong cooling in the upstream portion of the screw 11, the plastic material will remain cold or will increase in temperature only very slowly, so that there will be no risk of shearing of the compacted material.

In the plasticizing zone, on the other hand, much less cooling will be provided. The function of the threads there will no longer be to increase the thrusting pressure but rather to cause the kneading and mixing of the particles. Because the cooling conditions are different from those prevailing in the upstream portion, heating will then be rapid and generalized. The plastic material will be transformed into a fluid mass having a homogeneous temperature. Thus there is produced at the downstream end of the screw a mass exhibiting the requisite conditions for extrusion at a high rate of output despite the use of a proportionately small-size screw rotating at high speed.

What is claimed is:

1. In a plastics extruder of the type wherein a screw is rotatingly driven within a hollow cylinder and wherein a feed zone is followed by an adjacent plasticizing zone situated downstream from said feed zone, the improvement which comprises a said feed zone including:

a portion of said screw having a cylindrical core, at least one continuous spiral thread of uniform pitch projecting from said core, and a cooling circuit accommodated within said core throughout the entire length of said feed zone, and a portion of said cylinder having one or more spiral threads disposed on the inside surface of said cylinder, delimiting one or more spiral grooves, and running in a direction opposite to that of said at least one spiral thread of said screw portion.

2. An extruder in accordance with claim 1, wherein said plasticizing zone includes a further portion of said screw having a cylindrical core which is a continuation of said cylindrical core of said feed zone, two continuous spiral threads of uniform but differing pitch projecting from said continuation, and a further portion of said cylinder having a smooth inside surface.

3. An extruder in accordance with claim 2, wherein said continuation is provided with a further cooling circuit separate from said feed zone cooling circuit.

4. An extruder in accordance with claim 3, wherein said further cooling circuit comprises an intake and an outlet situated at an upstream end of said screw, said feed zone cooling circuit and said further cooling circuit being coaxial.

5. An extruder in accordance with claim 2, wherein said feed zone portion of said cylinder and said further portion of said cylinder are equipped with cooling circuits independent of one another.

6. An extruder in accordance with claim 5, wherein the two said cylinder portions each comprise a metal body, these two metal bodies being secured to one another with a heat barrier therebetween.

7. An extruder in accordance with claim 6, wherein said heat barrier is an insulating gasket inserted between said cylinder portions.

8. An extruder in accordance with claim 1, wherein the length of said feed zone is at least twice the diameter of said screw.

* * * * *